United States Patent [19]

Abdou-Sabet et al.

[11] 4,104,329

[45] Aug. 1, 1978

[54] ACRYLATE-MODIFIED ETHYLENE-VINYL ACETATE POLYMER

[75] Inventors: Sabet Abdou-Sabet; J. Paul Ferrin, both of Akron, Ohio

[73] Assignee: Monsanto Company, St. Louis, Mo.

[21] Appl. No.: 805,535

[22] Filed: Jun. 10, 1977

[51] Int. Cl.$^2$ ............................................. C08F 263/04
[52] U.S. Cl. ................................................ 260/878 R
[58] Field of Search .................................... 260/878 R

[56] References Cited

U.S. PATENT DOCUMENTS

| 3,806,555 | 4/1974 | Nagaoka et al. | 260/878 R |
|---|---|---|---|
| 3,817,851 | 6/1974 | Atchison et al. | 260/878 R |
| 3,852,177 | 12/1974 | Atchison et al. | 260/878 R |
| 3,974,132 | 8/1976 | Valdiserri | 260/878 R |
| 4,018,852 | 4/1977 | Schober | 260/878 R |

FOREIGN PATENT DOCUMENTS

| 853,640 | 11/1960 | United Kingdom | 260/878 R |
|---|---|---|---|
| 1,047,053 | 11/1966 | United Kingdom | 260/878 R |

Primary Examiner—Alan Holler
Attorney, Agent, or Firm—Larry R. Swaney

[57] ABSTRACT

Ethylene-vinyl acetate polymer is modified by reaction with a polyfunctional acrylate which improves the processing characteristics of the polymer. The cured modified polymers exhibit improved properties including lower hardness and greater dimensional stability.

20 Claims, No Drawings

ACRYLATE-MODIFIED ETHYLENE-VINYL ACETATE POLYMER

This invention relates to modified ethylene-vinyl acetate (EVA) polymers, and methods for their preparation, and, more particularly, to ethylene-vinyl acetate rubbery polymers modified by reaction with polyfunctional acrylates.

BACKGROUND OF THE INVENTION

Cross-linked EVA polymers are heat and solvent resistant specialty rubbers used in applications where high temperatures and/or exposure to organic solvents are encountered. EVA polymers are somewhat more difficult to process than many ordinary rubbers. For example, due to low viscosity EVA polymers tend to become soupy at processing temperatures making them more difficult to handle on mills and extruders. Also articles of cured EVA polymer tend to permanently distort when pulled while still warm from a mold or from a mandrel. Curing in an auto-clave is not always satisfactory because parts tend to exhibit too much surface tack when cured in this manner. These and other disadvantages are overcome by the acrylate-modified EVA polymers of this invention.

SUMMARY OF THE INVENTION

In accordance to this invention, EVA polymer as hereinafter defined is modified by reaction with polyfunctional acrylate compounds. The acrylate-modified EVA polymer is substantially free of cross-links (low gel content) and is characterized by increased Mooney Viscosity. The modified EVA polymer is a product of the original EVA polymer chain-extended by polyfunctional acrylate. The acrylate-modified EVA polymer exhibits improved processability, i.e., it handles better on mills or calendering equipment and exhibits greater green strength which gives better shape retention of uncured extruded parts. The acrylate-modified EVA polymer can be cured in conventional manner to give an elastomeric product. Elastomers prepared from EVA polymers modified by polyfunctional acrylate in the presence of filler exhibit reduced hardness. Elastomers prepared by autoclave curing of acrylate-modified EVA polymers of the invention exhibit reduced surface tackiness and less tendency to deform when removed from a hot mold or mandrel (better shape retention of cured product).

The acrylate-modified EVA polymers of the invention are prepared by masticating massed EVA polymer and polyfunctional acrylate, in an amount effective to modify but without substantially cross-linking the polymer, at a temperature and for a time sufficient to effect modification of the polymer. The amount of polyfunctional acrylate depends upon the type of polyfunctional acrylate used and the amount of modification desired. Generally, the amount is between 0.2 to 10 parts by weight of polyfunctional acrylate per 100 parts by weight EVA polymer but lesser or greater amounts effect modification of the polymer. Amounts between 0.5 to 5 parts by weight of polyfunctional acrylate per 100 parts by weight of EVA polymer are preferred. Any temperature at which the polyfunctional acrylate reacts with the EVA polymer is suitable. Typically, the reaction temperature is between 75°–200° C, preferably between 100°–150° C, with longer reaction times being required at the lower temperatures. High temperatures can lead to excessive degradation of the polymer. Typical reaction times are between 0.5–30 minutes. Mastication can be carried out on conventional rubber mixing equipment, such as, Banbury mixers, Brabender mixers and mixing extruders.

In one embodiment of the invention, EVA polymer and polyfunctional acrylate are masticated with azo free-radical initiator. Azo free-radical initiators, known polymerization catalysts, catalyze the reaction of polyfunctional acrylate and EVA polymer and reduce both reaction temperature and reaction time. Another embodiment of the invention comprises masticating at reaction temperature EVA polymer, polyfunctional acrylate and filler, such as carbon black or silica. A cured composition prepared from acrylate-modified EVA polymer modified in the presence of filler exhibits lower hardness than a similar composition prepared from acrylate-modified EVA polymer wherein the filler is incorporated after the modification reaction is complete.

The term "EVA polymer" as used herein and the claims means rubbery amorphous copolymers of ethylene and vinyl acetate containing 25 to 75, more preferably 40 to 70 percent by weight vinyl acetate. Some crystallinity may be present but essentially completely amorphous polymers are preferred. Density increases with vinyl acetate content with satisfactory polymers generally having density between 0.94–1.04. EVA polymers are prepared by free radical initiated polymerization of ethylene and vinyl acetate at ultra high pressure. The average molecular weight of the copolymer is usually between 100,000 and 400,000. Satisfactory EVA polymers include hydrolyzed EVA polymers containing up to 5% hydroxyl groups. Suitable ethylene/vinyl acetate polymers and formulation variables are described in greater detail in Rubber Age, June 1971, pp. 37–47; July 1971, pp. 63–70 and Rubber World, August 1976, p. 27. EVA polymer is commercially available under the trade name Vynathene.

Polyfunctional acrylate compounds satisfactory for use in the practice of the invention are characterized by the general formula

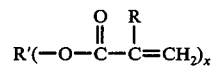

wherein $x$ is 2 to 5, R is hydrogen or methyl and R' is $C_1$-$C_{10}$ straight or branched chain polyvalent alkane radical, hydroxyalkane radical or said alkane radicals interrupted by —O—, phenylene, phenyleneoxy, or isocyanurate radical. Preferably, R is hydrogen and R' contains 2 to 5 alkane carbon atoms either between the acrylate moieties or the interrupting radical. Compounds in which $x$ is at least 3 are more preferred. Examples of suitable polyfunctional acrylates are:

PENTAERYTHRITOL TRIACRYLATE (PETA)
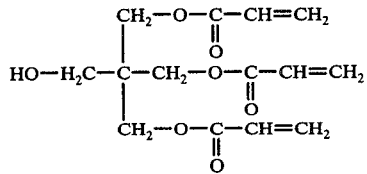
DIPENTAERYTHRITOL MONOHYDROXYPENTA ACRYLATE
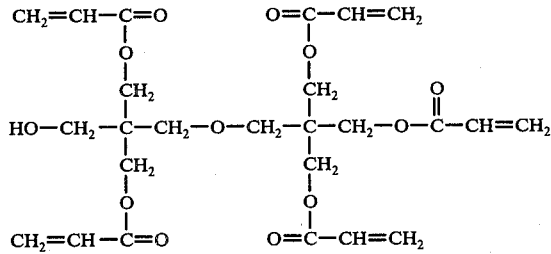
PENTAERYTHRITOL TETRAACRYLATE
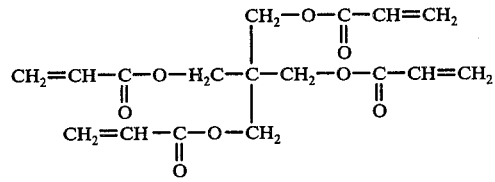
1,4 BUTANE DIOL DIACRYLATE
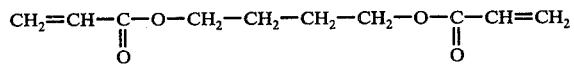
TRIMETHYLOL PROPANE TRIMETHACRYLATE
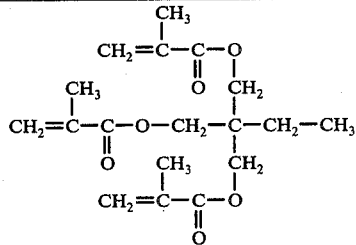
1,6 HEXANE DIOL DIMETHACRYLATE
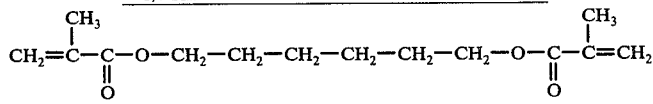
1,6 HEXANE DIOL DIACRYLATE
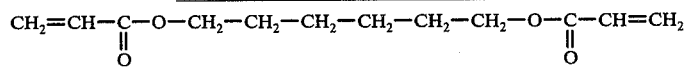
TRIMETHYLOL PROPANE TRIACRYLATE (TMPTA)
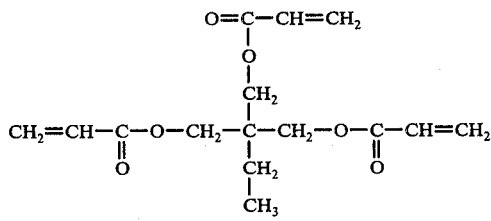
ETHYLENE GLYCOL DIMETHACRYLATE (EGDMA)
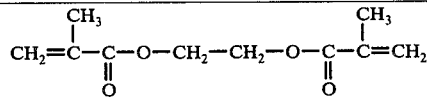

DIETHYLENE GLYCOL DIMETHACRYLATE
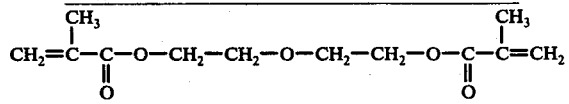

POLYETHYLENE GLYCOL DIMETHACRYLATE
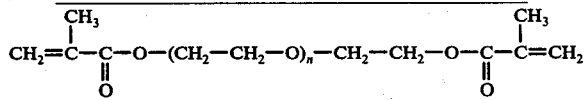

n=1–10, mainly about 3

TETRAETHYLENE GLYCOL DIMETHACRYLATE
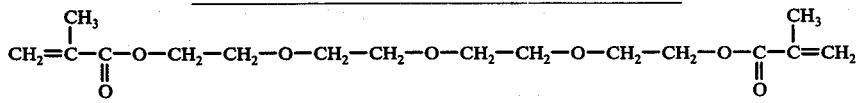

TRIETHYLENE GLYCOL DIMETHACRYLATE
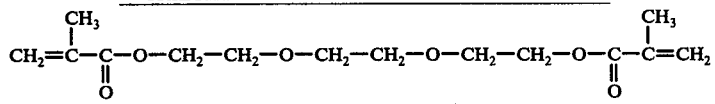

PENTAERYTHRITOL TETRAMETHACRYLATE
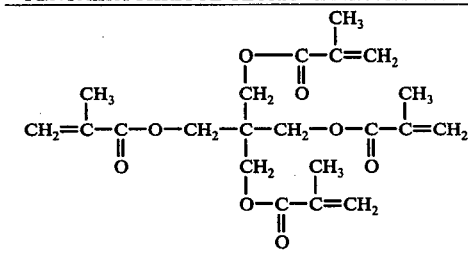

NEOPENTYL GLYCOL DIACRYLATE (NPGDA)
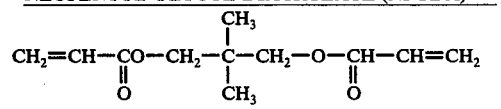

1,3 BUTYLENE GLYCOL DIACRYLATE
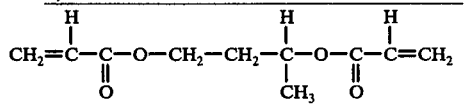

DIETHYLENE GLYCOL DIACRYLATE
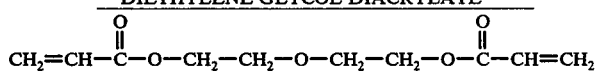

1,3 BUTYLENE GLYCOL DIMETHACRYLATE
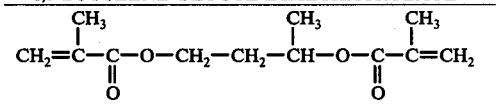

TETRAETHYLENE GLYCOL DIARCYLATE
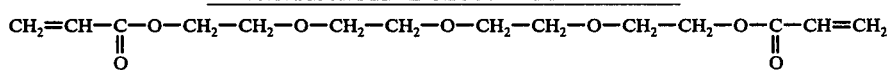

POLYETHYLENE GLYCOL 200 DIACRYLATE
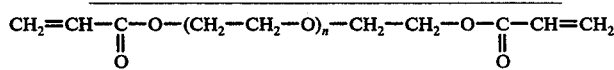

n=1–10, mainly about 3

ETHOXYLATED BISPHENOL A DIMETHACRYLATE
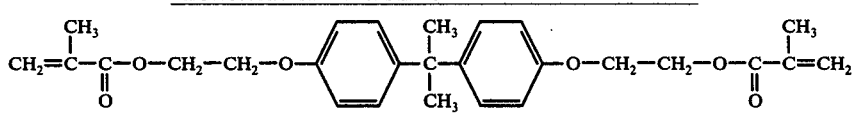

-continued
TRIACRYLATE OF (TRIS 2-HYDROXYETHYL) ISOCYANURATE (ICTA)

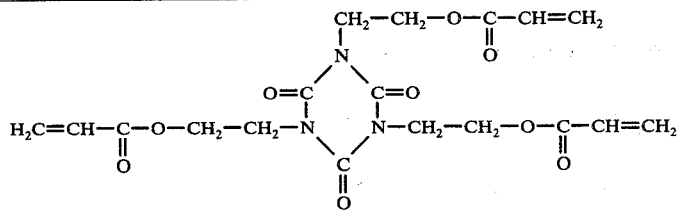

Any azo free radical initiator may be used in the practice of the invention to initiate the acrylate modification reaction. Suitable azo free radical initiators are characterized by the nucleus —N≡N— where the unsatisfied valences are satisfied by organic radicals, preferably attached through aliphatic carbon. Typical examples of suitable azo compounds many of which are commercially available as polymerization initiators are 2,2'-azobis(2-methylpropionitrile), 2-t-butylazo-2-cyanopropane, 2-t-butylazo-2-cyanobutane, 2-t-butylazo-1-cyanocyclohexane, 2-t-butylazo-2-cyano-4-methoxy-4-methylpentane, 1-t-amylazo-1-cyanocyclohexane, 2-t-butylazo-2,4-dimethoxy-4-methylpentane and 2-t-butylazo-2-cyano-4-methylpentane.

Any curative or curative system applicable for curing EVA rubbers may be used for vulcanizing the acrylate-modified EVA polymer of the invention, for example, peroxide, azide and certain sulfur-vulcanizing systems. The selection of any particular vulcanizing system varies depending upon the nature of the EVA polymer of the intended use of the vulcanizate. For example, an organic peroxide as the sole vulcanizing agent is satisfactory but it is preferred to use a co-agent such as TAC along with the peroxide. The use of curative co-agents enhances the cross-linking efficiency of the peroxide. High energy radiation is also utilizable as the curative means.

Examples of suitable peroxide curatives are lauryl peroxide, benzoyl peroxide, lead peroxide, bis-2,4-dichlorobenzoyl peroxide, dicumyl peroxide, di-t-butyl-peroxide, 2,5-dimethyl-2,5-bis(t-butylperoxy)hexane, 1,1-bis(t-butylperoxy)-3,3,5-trimethyl cyclohexane, tris-α,α-dimethyl-α(butylperoxy)-methyl benzene, α,α-bis(-butylperoxy)diisopropyl benzene, bis-(4-t-butylcyclohexyl)peroxydicarbonate, n-butyl-4,4-bis(t-butylperoxy)valerate and t-butyl perbenzoate. Examples of suitable polyfunctional cross-linking agents which may be used either alone or as co-agents are dibenzo-p-quinonedioxime, p-quinonedioxime, n-phenylene bis-maleimide and triallyl cyanurate (TAC). Acrylates described in U.S. Pat. No. 3,751,378 including the polyfunctional acrylates initially used to modify the EVA polymer may also be used as co-agents.

The amount of curative varies depending upon the type of curative and other ingredients present in the composition to be cured. Enough curative must be used to cross-link the polymer to give an elastomer while avoiding excessive quantities of curatives beyond the amount necessary to fully cure the polymer which can result in diminution of properties.

The properties of the compositions of the invention may be modified by addition of ingredients which are conventional in the compounding of EVA polymer. Examples of such ingredients include carbon black, silica, titanium dioxide, colored pigments, clay, zinc oxide, stearic acid, accelerators, vulcanizing agents, sulfur, stabilizers, antidegradants, processing aids, adhesives, tackifiers, rubber plasticizers, wax, extender oils and discontinuous fibers such as wood cellulose fibers, glass fibers, nylon fibers and polyester fibers. The addition of carbon black, rubber plasticizer or both, are particularly recommended. Carbon black improves the tensile strength and rubber plasticizer can improve the resistance to oil swell, heat stability, hysteresis, permanent set and cost of the cured compositions. Typical additions of carbon black comprise about 20-100 parts by weight of carbon black per 100 parts by weight of EVA polymer and usually about 25-60 parts by weight carbon black per 100 parts total weight of EVA polymer and plasticizer. The amount of carbon black which can be used depends, at least in part, upon the type of black and the amount of plasticizer present. The compositions may also be extended by the addition of thermoplastics such as polyethylene, polypropylene, polyethyleneoxide, and the like. Plasticized EVA polymer containing up to 50 parts by weight, preferably between 10-40 parts by weight, plasticizer per 100 parts by weight EVA polymer are particularly suitable. The higher the molecular weight of the polymer, the more plasticizer can be used. Generally, the quantity of plasticizer when present is between 10-30 weight percent of the total composition. Any plasticizer suitable for EVA polymer may be used. Suitable plasticizers include polypropylene glycol, phthalate esters such as dicyclohexyl phthalate, dimethyl phthalate, dioctyl phthalate, butyl benzyl phthalate, benzyl phthalate, phosphates such as tributoxy-ethyl phosphate, tributyl phosphate, tricresyl phosphate, cresyl diphenyl phosphate, 2-ethylhexyl diphenyl phosphate, isodecyl diphenyl phosphate, and triphenyl phosphate, and phthalyl glycolates such as butyl phthalyl butyl glycolate.

The compositions of the invention are useful for making a variety of articles such as tires, hoses, belts, gaskets, moldings and molded parts. They are particularly useful for articles made by extrusion, injection molding and compression molding techniques.

The stress-strain properties of the compositions are determined in accordance with the test procedures set forth in ASTM D638 and ASTM D1566. Mooney Viscosity is determined using a Mooney Plastometer under the conditions of ML(1+4) at 100° C.

DESCRIPTION OF PREFERRED EMBODIMENTS

To illustrate the invention, compositions are compounded containing the ingredients shown below. Quantities (parts by weight) are indicated in parenthesis. EVA polymer (100), precipitated silica (30), magnesium oxide (1), titanium oxide (4.3), stearic acid (0.5), silane coupling agent (0.30), polymerized 1,2 dihydro-2,2,4-trimethylquinoline, an antioxidant (0.6), α,α'bis(t-butylperoxy)diisopropylbenzene, 40% in clay, (3.0) and triallyl cyanurate (0.25). Stocks illustrative of the invention also contain 2,2' azobis(2-methylpropionitrile) (0.15) designated AZDN, an azo free radical initiator, and a polyfunctional acrylate in the proportions indicated in Table I. All of the ingredients except the peroxide curative and TAC are compounded in a Banbury mixer at 120°–140° C by the following procedure. The EVA polymer and silica are charged to the mixer and masticated for one minute, all the ingredients (including the polyfunctional acrylate) except the azo free-radical initiator and antioxidant are then charged and mixing is continued for one additional minute. One half the azo free-radical initiator is then added and after mixing one half-minute the remainder is added. Mixing is continued for 2.5 additional minutes followed by addition of the antioxidant. Mixing is continued for one additional minute to give a total mixing cycle of 6 minutes. The batch is dumped, cooled and transferred to a rubber mill where the curatives are incorporated at about 40° C. The EVA polymer of Tables 1, 2, 3, 4 and 6 contain about 50 weight percent vinyl acetate. The polyfunctional acrylates illustrating the invention are trimethylol propane triacrylate (TMPTA), pentaerythritol triacrylate (PETA), neopentyl glycol diacrylate (NPGDA), triacrylate of tris-2-hydroxyethyl isocyanurate (ICTA) and ethylene glycol dimethacrylate (EGDMA).

Referring to Table I, Stock 1 is a control containing no polyfunctional acrylate. Stock 2 is another control wherein polyfunctional acrylate is added on the mill to avoid reaction with the EVA polymer until the sample is cured when the polyfunctional acrylate serves as a co-cross-linking agent. Stocks 3–5 illustrating the invention contain polyfunctional acrylate and azo free-radical initiator. The Mooney Viscosity of compounded compositions prior to curing is shown and the properties of the cured elastomeric compositions. The data show that the Mooney Viscosity of control Stock 1 is 43 and that the cured product has a Shore A hardness of 73. The data of Stock 2 show that polyfunctional acrylate TMPTA acts as a plasticizer in the uncured composition reducing the Mooney Viscosity to 38 but increases the Shore A hardness of the cured composition to 76. The data of Stocks 3–5 show that acrylate modification of the EVA polymer increases the Mooney Viscosity of the compounded compositions which compositions when cured exhibit reduced Shore A hardness. The data indicate that the triacrylates of Stocks 3 and 4 more effectively increase the Mooney Viscosity than the diacrylate of Stock 5 but that the diacrylate has a greater affect upon hardness.

In Table 2, four of the stocks of Table 1 are repeated using a different EVA polymer (same VA content but lower molecular weight) and 0.2 parts of azo free-radical initiator. The data show that similar results are obtained, i.e., the acrylate-modified EVA polymer compositions exhibit higher Mooney Viscosities which compositions upon curing exhibit lower hardness. Again, the triacrylate modified EVA polymer compositions exhibit greater improvement in viscosity, and the diacrylate modified EVA polymer composition exhibits lower hardness upon curing.

TABLE 1

| Stock No. | 1 | 2 | 3 | 4 | 5 |
|---|---|---|---|---|---|
| EVA polymer (50% VA) | 100 | 100 | 100 | 100 | 100 |
| AZDN | — | — | 0.15 | 0.15 | 0.15 |
| TMPTA | — | 3.0 | 3.0 | — | — |
| PETA | — | — | — | 3.0 | — |
| NPGDA | — | — | — | — | 3.6 |
| Mooney Viscosity | 43 | 38 | 52 | 53 | 46 |
| (Compounded) Press Cure at 165° C, 55 min. | | | | | |
| M 100, kg./cm$^2$ | 29 | 41 | 29 | 30 | 26 |
| M 200, kg./cm$^2$ | 72 | 98 | 85 | 85 | 71 |
| UTS, kg./cm$^2$ | 255 | 237 | 233 | 211 | 223 |
| Ult. Elong., % | 440 | 380 | 430 | 370 | 440 |
| Hardness, Shore A | 73 | 76 | 68 | 68 | 66 |

TABLE 2

| Stock No. | 1 | 2 | 3 | 4 |
|---|---|---|---|---|
| EVA polymer (50% VA) | 100 | 100 | 100 | 100 |
| PETA | — | 3.0 | — | — |
| TMPTA | — | — | 3.0 | — |
| NPGDA | — | — | — | 3.6 |
| AZDN | — | 0.2 | 0.2 | 0.2 |
| Mooney Viscosity | 36 | 47 | 46 | 40 |
| (Compounded) Press Cure at 165° C, 45 min. | | | | |
| M 100, kg./cm$^2$ | 28 | 30 | 28 | 22 |
| M 200, kg./cm$^2$ | 71 | 88 | 83 | 70 |
| UTS, kg./cm$^2$ | 237 | 229 | 216 | 211 |
| Ult. Elong.,% | 420 | 390 | 390 | 390 |
| Hardness, Shore A | 72 | 67 | 67 | 63 |

A study of the effect of concentration of polyfunctional acrylate and azo free-radical initiator is shown in Table 3. The ingredients and formulation are the same as in Table 1, however, the acrylate-modified EVA polymer is prepared in the absence of other compounding ingredients. The EVA polymer and polyfunctional acrylate are charged to a Brabender mixer at 125° C and masticated until a uniform mass is obtained (about 1 minute), azo free-radical initiator is then added and mastication is continued for a total mixing time of 4 minutes. Mooney Viscosity and gel content of the stocks are determined. The gel content is determined by soaking a polymer specimen in tetrahydrofuran overnight at room temperature and filtering the resulting solution through 0.9 micron filter paper. Percent gel content is calculated by dividing the weight of the dried residue on the filter paper by the original sample weight and multiplying by 100.

Curable compositions are compounded by charging the modified EVA polymer and all the compounding ingredients except curatives to a Brabender mixer at 60° C. After masticating for 3 minutes, the curatives are charged and the mass is masticated for one additional minute. The Mooney Viscosity is determined on the compounded compositions and then portions of the stocks are press cured and other portions of the stocks are open cured in an autoclave. The surface stickness of the autoclave cured specimens are observed by touch. The amount that an autoclave cured specimen is permanently deformed as a consequence of removing the specimen while still warm from the backing plate is also measured. The cured specimen is 7.5 × 7.5 cm and about 0.2 cm thick. The specimen is removed from the backing plate by pulling one corner of the specimen in the direction of the diagonal of the opposite corner. The amount of deformation is determined by measuring the distance the corners are curled from the horizontal plane of the specimen.

Referring to Table 3, Stock 1 is a control which contains no polyfunctional acrylate. Stocks 2–4 illustrate the invention with different concentrations of azo free-radical initiator and polyfunctional acrylate. The data show that the acrylate modified EVA polymers exhibit about double the Mooney Viscosity compared to the unmodified polymer. The low gel content indicates that very little cross-link formation has occurred and suggests that the acrylate modification reaction is primarily a chain extension mechanism. The data also show that the improvement in viscosity is carried over into the fully compounded composition. The data further show that increasing the concentration of either azo free-radical initiator or polyfunctional acrylate results in increased modulus in the cured product. The autoclave cured products of the acrylate modified EVA polymer show a reduction in surface tack and a marked improvement in deformation caused by removing the samples from the backing sheet.

TABLE 3

| Stock No. | 1 | 2 | 3 | 4 |
|---|---|---|---|---|
| EVA polymer (50% VA) | 100 | 100 | 100 | 100 |
| TMPTA | — | 3 | 3 | 5 |
| AZDN | 0.15 | 0.15 | 0.3 | 0.15 |
| Mooney Viscosity | 16 | 31 | 30 | 32 |
| Gel, 0.9μ,% | 3.1 | 0 | 1.8 | 5.4 |
| Compounded Composition | | | | |
| Mooney Viscosity | 42 | 58 | 51 | 56 |
| Press Cure at 160°, 60 min. | | | | |
| M 100, kg./cm$^2$ | 36 | 28 | 39 | 49 |
| M 200, kg./cm$^2$ | 86 | 84 | 102 | 127 |
| UTS, kg./cm$^2$ | 246 | 225 | 254 | 240 |
| Ult. Elong.,% | 380 | 320 | 360 | 310 |
| Autoclave Cure at 160° C, 60 min. | | | | |
| M 100, kg./cm$^2$ | 37 | 31 | 40 | 47 |
| M 200, kg./cm$^2$ | 78 | 89 | 91 | 111 |
| UTS, kg./cm$^2$ | 189 | 212 | 180 | 250 |
| Ult. Elong.,% | 380 | 370 | 330 | 380 |
| Hardness, Shore A | 72 | 70 | 74 | 74 |
| Surface deformation,cm | tacky 2.0 | — — | sl. tacky none | none none |

The invention is further illustrated in Table 4. The compounded formulation is the same as in Table 1. The EVA polymer and polyfunctional acrylate are charged to a Brabender mixer at 120° C (except for Stock 3 which is mixed at 150° C and Stock 4 which is mixed at 175° C) and masticated until a uniform mass is obtained (about 1 minute), azo free-radical initiator is then added and mastication is continued for 1.5 minutes after the maximum consistency is reached. Curable compositions are compounded by the same procedure as in Table 3. Referring to Table 5, Stock 1 is a control with unmodified EVA polymer. Stock 2 contains polyfunctional acrylate but no azo free-radical initiator. Stocks 3 and 4 are the same as Stock 2 but mastication is carried out at 150° and 175° C, respectively. Stock 5 contains the same polyfunctional acrylate, trimethylol propane triacrylate, as Stocks 2, 3 and 4 but also contains azo free-radical initiator. Stocks 6–9 contain different polyfunctional acrylates. The data show that at 120° C trimethylol propane triacrylate does not react in the absence of azo free-radical initiator (Stock 2 vs Stock 5), however, it acts as a co-agent when the composition is cured. Stocks 3 and 4 show that the extent of modification is temperature dependent in the absence of azo free-radical initiator. Stock 5 shows that the presence of azo free-radical initiator substantially reduces the temperature necessary to effect modification of the EVA polymer. The data of Stocks 6–9 indicate that the other polyfunctional acrylates are not as effective as TMPTA in respect to the Mooney Viscosity of the neat modified EVA polymer but are more nearly the same in respect to the Mooney Viscosity of the compounded composition.

TABLE 4

| Stock No. | 1 | 2 | 3 | 4 | 5 | 6 | 7 | 8 | 9 |
|---|---|---|---|---|---|---|---|---|---|
| EVA polymer (50%VA) | 100 | 100 | 100 | 100 | 100 | 100 | 100 | 100 | 100 |
| TMPTA | — | 3 | 3$^1$ | 3$^2$ | 3 | — | — | — | — |
| TMPTMA | — | — | — | — | — | 3.43 | — | — | — |
| EGDMA | — | — | — | — | — | — | 3.01 | 6.73 | — |
| ICTA | — | — | — | — | — | — | — | — | 4.41 |
| AZDN | — | — | — | — | 0.15 | 0.15 | 0.15 | 0.15 | 0.15 |
| Mooney Viscosity | 14 | 12 | 18 | 42 | 33 | 22 | 20 | 25 | 23 |
| Compounded Composition | | | | | | | | | |
| Mooney Viscosity Press Cure at 160° C,60 min. | 37 | 38 | 43 | 57 | 57 | 53 | 47 | 61 | 53 |
| M$_{100}$, Kg./cm$^2$ | 39 | 41 | 44 | 37 | 36 | 41 | 38 | 53 | 39 |
| M$_{200}$, Kg./cm$^2$ | 117 | 136 | 139 | 155 | 146 | 151 | 146 | 193 | 136 |
| UTS, Kg./cm$^2$ | 187 | 243 | 214 | 238 | 252 | 220 | 254 | 206 | 210 |
| Ult.Elong.,% | 400 | 460 | 410 | 400 | 440 | 390 | 430 | 310 | 400 |
| Hardness, Shore A | 80 | 82 | 81 | 78 | 80 | 81 | 78 | 83 | 81 |
| Autoclave Cure at 160° C, 60 min. | | | | | | | | | |
| Surface deformation,cm | tacky 4.1 | tacky 3.1 | sl.tacky 2.3 | none 0.9 | none 0.8 | none 2.3 | none 2.0 | none 2.5 | none 1.3 |

$^1$150° C
$^2$175° C

Acrylate-modification of EVA polymers containing various amounts of vinyl acetate are illustrated in Table 5. Stocks designated A are controls containing unmodified EVA polymer, whereas, stocks designated B are acrylate-modified EVA polymer compositions of the invention. The formulation is the same as in Table 1. The stocks are prepared in a Brabender mixer in accordance with the procedure of Table 3. Sample 3 illustrates a hydrolyzed EVA polymer containing 3.2 weight percent OH. The Mooney Viscosities of the unmodified EVA polymer, the acrylate modified EVA polymer and the corresponding compounded compositions are recorded. The compositions are cured in an autoclave at 160° C for 60 minutes. The acrylate-modified EVA polymer compositions exhibit higher viscosity, reduced surface tack and less deformation upon removal from the mold.

A study of different azo free-radical initiators is shown in Table 6. The compositions are the same (except for initiator) as in Table 1 and the procedure is the same except for time) as in Table 3. The EVA polymer, initiator and polyfunctional acrylate are charged to a Brabender mixer at 125° C. The ingredients are masticated until the maximum Brabender consistency is reached. The time at which the Brabender consistency begins to rise is noted which time is called initiation time. The time between the initiation time and the time at which the maximum consistency is reached is called reaction time. The sum of initiation time and reaction time is the total mixing time. In Stock 4, the Brabender oil bath temperature is 150° instead of 125° C. In an experiment (not shown) the initiation time for a similar stock containing 1-t-butylazo-1-cyanocyclohexane when masticated at 125° C is 18 minutes and the reaction time is 4 minutes, however, the autoclave cured compositions exhibit reduced tack and lower deformation when removed from mold.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An acrylate-modified EVA polymer which comprises the product of EVA polymer and polyfunctional acrylate of the formula

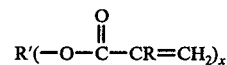

wherein $x$ is 2 to 5, R is hydrogen or methyl, and R' is

TABLE 5

| Stock No. | EVA Polymer wt. % VA | Mooney Neat | Viscosity Compounded | M 100, Kg./cm² | UTS Kg./cm² | Ult. Elong. % | Hardness Shore A | Surface | |
|---|---|---|---|---|---|---|---|---|---|
| | | | | | | | | Tack | deformation, cm |
| 1A | 26 | 8 | — | 82 | 179 | 270 | 90 | slight | 3.6 |
| 1B | 26 | 17 | 26 | 94 | 181 | 240 | 94 | none | 1.0 |
| 2A | 40 | 14 | 33 | 39 | 118 | 290 | 80 | slight | 3.3 |
| 2B | 40 | 27 | 48 | 46 | 205 | 330 | 81 | none | none |
| 3A | 46(3.2%OH) | 33 | 52 | 18 | 129 | 440 | 61 | none | 0.2 |
| 3B | 46(3.2%OH) | 52 | 79 | 28 | 174 | 460 | 64 | none | none |
| 4A | 50 | 16 | 34 | 26 | 158 | 360 | 69 | slight | 3.3 |
| 4B | 50 | 36 | 58 | 39 | 172 | 310 | 73 | none | none |
| 5A | 60 | 24 | 45 | 28 | 109 | 250 | 66 | tacky | 1.0 |
| 5B | 60 | 36 | 56 | 39 | 151 | 260 | 71 | none | 1.0 |
| 6A | 70 | 6 | 21 | 31 | 70 | 220 | 68 | none | 3.6 |
| 6B | 70 | 16 | 36 | 37 | 103 | 230 | 68 | none | 1.5 |

TABLE 6

| Stock No. | 1 | 2 | 3 | 4 | 5 |
|---|---|---|---|---|---|
| EVA polymer (50% VA) | 100 | 100 | 100 | 100 | 100 |
| TMPTA | — | 3 | 3 | 3 | 3 |
| 2-t-butylazo-2-cyano-4-methylpentane | — | 0.2 | — | — | — |
| 2-t-butylazo-2-cyano-propane | — | — | 0.2 | — | — |
| 1-t-butylazo-1-cyanocyclohexane[1] | — | — | — | 0.2 | — |
| 2,2'-azo-bis-(2-methylpropionitrile) | — | — | — | — | 0.2 |
| Initiation time,min. | — | 4 | 3 | 3.5 | 1 |
| Reaction time,min. | — | 3.5 | 4 | 3.5 | 2 |
| Mooney Viscosity Compounded Composition | 16 | 29 | 35 | 42 | 37 |
| Mooney Viscosity Autoclave Cure at 160° C, 60 minutes | 40 | 52 | 60 | 64 | 60 |
| M 100,Kg./cm² | 36 | 37 | 38 | 37 | 39 |
| M 200,Kg./cm² | 76 | 86 | 89 | 91 | 97 |
| UTS,Kg./cm² | 210 | 210 | 214 | 172 | 196 |
| Ult. Elong.,% | 430 | 380 | 380 | 310 | 330 |
| Hardness,Shore A | 70 | 74 | 74 | 71 | 74 |
| Surface | tacky | none | none | none | none |
| deformation,cm | 1.5 | 0.5 | 0.5 | 0.5 | 0.9 |

[1]150° C

Mooney Viscosity of the acrylate-modified EVA polymer and compounded composition and the properties of the cured product are substantially the same as obtained for Stock 4. The data show that 1-t-butylazo-1-cyanocyclohexane has the greater effect upon viscosity but that 2,2'-azo-bis-(2-methylpropionitrile) is more efficient since it requires less than one-half the mixing time than any of the other initiators. The data show that all the acrylate-modified EVA polymers, regardless of the initiator used, exhibit improved viscosity and that the $C_1$-$C_{10}$ alkane radical, hydroxyalkane radical or said alkane radicals interrupted by —O—, phenylene, phenyleneoxy, or isocyanurate radical in which the product is substantially free of cross-links.

2. The polymer of claim 1 wherein the EVA polymer contains 25-75 weight percent vinyl acetate and the product contains 0.1 to 10 weight percent of polyfunctional acrylate.

3. The polymer of claim 2 wherein the EVA polymer contains 40-70 weight percent vinyl acetate and the product contains 0.5 to 5 weight percent of polyfunctional acrylate.

4. The polymer of claim 2 wherein R is hydrogen and $x$ is at least 3.

5. The polymer of claim 4 wherein R' is $C_2$-$C_5$ alkane or hydroxyalkane radical.

6. The polymer of claim 5 wherein the polyfunctional acrylate is trimethylol propane triacrylate.

7. An elastomer produced by heating acrylate-modified EVA polymer of claim 1 with curative.

8. The elastomer of claim 7 wherein the curative is an organic peroxide cross-linking agent.

9. The elastomer of claim 7 wherein the curative is a mixture of organic peroxide cross-linking agent and triallyl cyanurate.

10. An elastomer of claim 7 wherein the EVA polymer contains 40-70 weight percent vinyl acetate, the product contains 0.5 to 5 weight percent of polyfunctional acrylate, R is hydrogen and $x$ is at least 3.

11. A process for the preparation of acrylate-modified EVA polymer which comprises masticating massed EVA polymer and, in an amount effective to modify but without substantially cross-linking the polymer, polyfunctional acrylate of the formula

wherein $x$ is 2 to 5, R is hydrogen or methyl, and R' is $C_1$–$C_{10}$ alkane radical, hydroxyalkane radical or said alkane radicals interrupted by —O— phenylene, phenyleneoxy, or isocyanurate radical, at a temperature and for a time sufficient to effect modification of the polymer.

12. The process of claim 11 wherein the EVA polymer and polyfunctional acrylate are masticated in the presence of azo free-radical initiator.

13. The process of claim 12 comprising masticating at 100°–150° C for 0.5–30 minutes EVA polymer containing 25–75 weight percent vinyl acetate and 1 to 10 parts by weight of polyfunctional acrylate per 100 parts by weight polymer.

14. The process of claim 13 wherein R is hydrogen and $x$ is at least 3.

15. The process of claim 14 comprising masticating EVA polymer containing 40–70 weight percent vinyl acetate and 0.5 to 5 parts by weight of polyfunctional acrylate per 100 parts by weight polymer.

16. The process of claim 15 wherein R' is $C_2$–$C_5$ alkane or hydroxyalkane radical.

17. The process of claim 16 wherein the polyfunctional acrylate is trimethylol propane triacrylate.

18. The process of claim 13 wherein the amount of azo free-radical initiator is 1 to 10 parts by weight per 100 parts by weight of polyfunctional acrylate.

19. The process of claim 18 wherein the azo free-radical initiator is 2,2'-azobis(2-methylpropionitrile).

20. The process of claim 14 wherein the EVA polymer and polyfunctional acrylate are masticated in the presence of filler.

* * * * *